US007420713B2

United States Patent
Ohmori

(10) Patent No.: US 7,420,713 B2
(45) Date of Patent: Sep. 2, 2008

(54) COLOR PRINTING APPARATUS CONFIGURED TO SUPERPOSE SPECIFIED PATTERN ON IMAGE

(75) Inventor: Masatake Ohmori, Zama (JP)

(73) Assignee: Ricoh Company, Ltd., Tokyo (JP)

( * ) Notice: Subject to any disclaimer, the term of this patent is extended or adjusted under 35 U.S.C. 154(b) by 912 days.

(21) Appl. No.: 10/870,642

(22) Filed: Jun. 17, 2004

(65) Prior Publication Data

US 2005/0128522 A1    Jun. 16, 2005

(30) Foreign Application Priority Data

Jul. 18, 2003    (JP) .............. 2003-199094

(51) Int. Cl.
*G06K 15/00* (2006.01)
*H04N 1/40* (2006.01)

(52) U.S. Cl. .............. 358/3.28; 358/1.9; 358/540

(58) Field of Classification Search ............... 358/1.1, 358/1.9, 3.28, 450, 453, 540; 382/100, 173; 283/73, 93, 94, 113, 114
See application file for complete search history.

(56) References Cited

U.S. PATENT DOCUMENTS

| | | | | |
|---|---|---|---|---|
| 4,978,971 A | * | 12/1990 | Goetz et al. ............... | 347/5 |
| 5,752,152 A | | 5/1998 | Gasper et al. | |
| 5,878,162 A | * | 3/1999 | Miyazaki et al. ............ | 382/162 |
| 5,881,173 A | | 3/1999 | Ohmori | |
| 6,160,640 A | | 12/2000 | Ohmori | |
| 6,256,110 B1 | | 7/2001 | Yoshitani | |
| 6,369,904 B1 | | 4/2002 | Bhattacharjya et al. | |
| 6,456,393 B1 | | 9/2002 | Bhattacharjya et al. | |
| 6,728,377 B1 | | 4/2004 | Ohmori | |
| 6,731,775 B1 | | 5/2004 | Ancin | |
| 6,750,985 B2 | * | 6/2004 | Rhoads ................... | 358/3.28 |
| 6,771,794 B1 | * | 8/2004 | Osaka ..................... | 382/100 |
| 7,002,710 B1 | | 2/2006 | Van Liew et al. | |
| 2002/0041718 A1 | | 4/2002 | Ohmori | |
| 2003/0067626 A1 | | 4/2003 | Ohmori et al. | |

FOREIGN PATENT DOCUMENTS

| | | |
|---|---|---|
| EP | 0655853 A2 | 5/1995 |
| EP | 0789480 A2 | 8/1997 |
| GB | 2361211 A | 10/2001 |
| JP | 11-268368 | 10/1999 |

(Continued)

OTHER PUBLICATIONS

Dec. 11, 2007 Japanese official action (with English translation) in connection with corresponding Japanese application No. 2003-199094.

*Primary Examiner*—Thomas D Lee
(74) *Attorney, Agent, or Firm*—Cooper & Dunham, LLP

(57) ABSTRACT

A color printing apparatus includes an image memory that stores input image data, an image data region extracting device that extracts an image data existing region in the image memory, a pattern data superposing device that superposes specified pattern data only on the image data stored in the image memory in accordance with a result of extraction performed by the image region extracting device, a data reordering device that reorders the image data in accordance with a printing manner, and a data launching device that launches data to an image formation system.

17 Claims, 11 Drawing Sheets

FOREIGN PATENT DOCUMENTS

| | | |
|---|---|---|
| JP | 11-331585 | 11/1999 |
| JP | 2000-165640 | 6/2000 |
| JP | 2000-313156 | 11/2000 |
| JP | 2002-240387 | 8/2002 |
| JP | 2002-278390 | 9/2002 |

* cited by examiner

FIG. 2
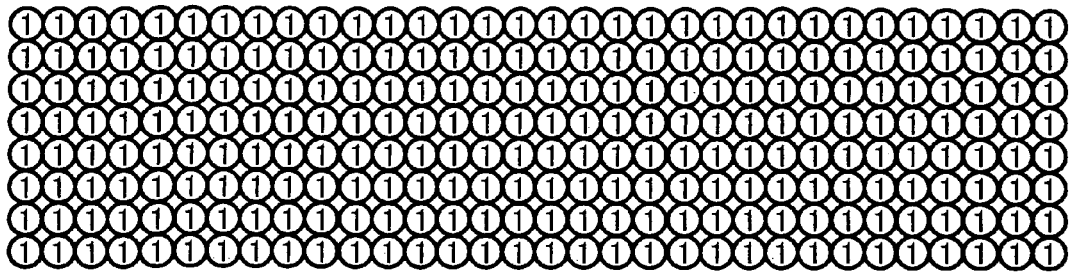
FIG. 3
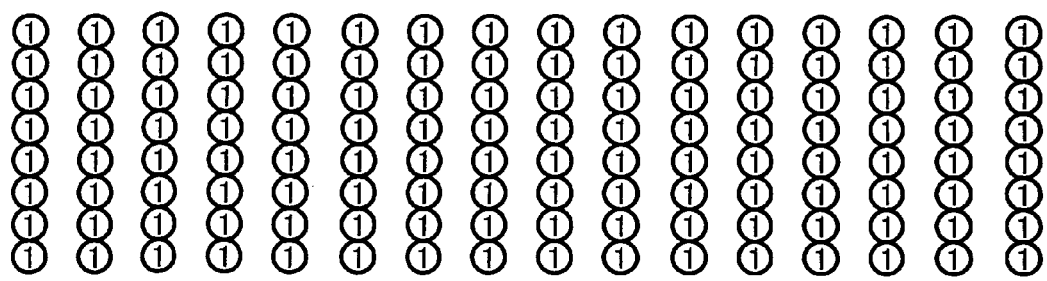
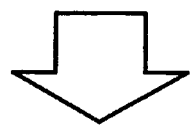
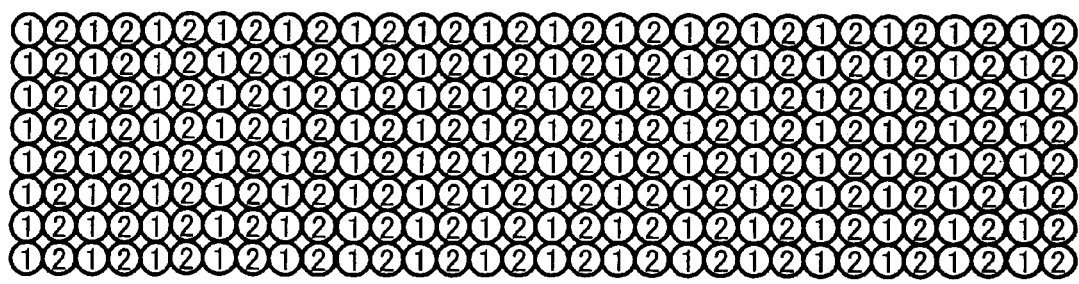

COLOR PRINTING APPARATUS CONFIGURED TO SUPERPOSE SPECIFIED PATTERN ON IMAGE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Technical Field

This disclosure relates generally to a color printing apparatus, such as an ink jet printing apparatus, a color copier, etc., and in particular to a color printing apparatus that superposes pattern data, which, for example, can be used for identifying a counterfeiting instrument, on image data in a memory.

2. Discussion of the Related Art

Recent advances in image resolution, image processing, and printing enable high precision color image printing at relatively lower cost. For example, a color printing apparatus employing an ink jet process can be used in a printing process which is capable of outputting a high precision and gradation color image at low cost. As a result, paper money and variable security and so on unfortunately can be counterfeited by employing such high precision input instruments.

In order to prevent such counterfeiting, a function of detecting specified information related to the paper money and either triggering an alarm or disenabling an input or output operation is generally included in input and printing instruments. In addition to stopping the above-mentioned operation, a capability of identifying an instrument, which has generated an output, is given importance in view of the ever present objective of reducing a crime rate. Thus, information identifying the output instrument is sometimes written on printing material by a manner of some kind. For example, a fine pattern not perceptible to the human eye can be embedded in an image, as discussed in Japanese Patent Application Laid Open No. 2000-313156. Further, as discussed in Japanese Patent Application Laid Open No. 2002-240387, information can be written with colorless special ink generating a light upon receiving an ultraviolet light as a reaction, or information itself is embedded and reversely converted after being mapped in a frequency region.

Embedding information hardly perceptible to the human eye in image data is perhaps the simplest method among the methods mentioned above. Specifically, image data is printed with pattern data capable of identifying a printing instrument with the pattern data being superposed thereon without giving influence thereto. The pattern data can be extracted to identify the output instrument based upon an output image.

When an image is formed by an ink jet process, a method most frequently used is to perform two dimensional image formation that discharges ink in accordance with input image information in synchronism with movement of a carriage in a main scanning direction while transporting recording medium in a sub scanning direction.

With such a recording process, printing efficiency (for example, a number of printing sheets per minute) can be improved by speeding up either sheet conveyance or movement of a carriage as fast as possible. For such a purpose, printing is sometimes shortened by either moving the carriage at higher speed in a data blank region than when printing or conveying a sheet at high speed in a blank in the sub scanning direction.

When such pattern data is to be superposed and output with image data, the above-mentioned operation cannot be speeded up and sometimes causes a problem, if a region of the image data is not detected. Since a blank entirely or substantially disappears from an original image if pattern data is excessively superposed even on the blank, an image is always output. As a result, the above-mentioned efficiency obtained by either moving the carriage or conveying a sheet at high speed is reduced.

It is desirable to solve these problems and to provide a color printing apparatus capable of superposing an instrument identifying pattern on an image while suppressing decrease in printing speed as little as possible.

SUMMARY

In an aspect of this disclosure, a novel and improved color printing apparatus is provided that features an image memory that stores input image data, an image region extracting device that extracts an image region from the image data in the image memory, an image superposing device that superposes pattern data on image data stored in the image memory in accordance with a result of the extraction performed by the image region extracting device, a data reordering device that reorders image data in accordance with a printing manner, and a data launching device that launches data to be printed to an image formation system. Since a required pattern is output only to an image data existing region after an image region is extracted from the image data, printing efficiency can be maintained.

A color printing apparatus, according to another embodiment, comprises storage means, image region extracting means, pattern superposing means, reordering means and transmitting means. The storage means stores input image data. The image region extracting means extracts an image data region from the image data stored in the storage means. The pattern superposing means superposes specified pattern data on the image data in accordance with a result of the extraction operation performed by the image region extracting means. The reordering means reorders the image data in accordance with a printing manner. The transmitting means transmits the image and pattern data to an image formation system.

In another embodiment, only one component color from amongst colors of printing use color separation planes, is used for pattern data. Thus, adverse influence from insertion of pattern information in an original image can be limited to a minimum.

In yet another embodiment, even if pattern data is superposed in any manner and anywhere in a color separation plane, for example, over the entire image plane, printing efficiency is not decreased by pattern data superposition, because the image region extracting device extracts an image region based upon image data in the color separation planes other than the color separation plane occupied by the pattern data superposed on the image data. Stated differently, regional extraction is executed from the other color separation plane data.

In yet another embodiment, a color of specified pattern data is not substantially perceptible to the human eye. For example, by writing with a component color such as yellow which is hardly perceptible to the human eye when a recording medium (such as a sheet) is white, written information can be hardly perceptible to human. Specifically, influence to an original image can be suppressed as small as possible.

In yet another embodiment, a color for the specified pattern data can be selected in accordance with a recording medium color. Since a color for write pattern information can be selected in accordance with a recording sheet color, pattern information can be written in accordance with the recording medium while being indistinctive but detectable.

In yet another embodiment, a color to write a pattern image can be selected in accordance with a sheet color by employing a color sensor that detects the sheet color and a color selecting device that automatically selects a component color for the specified pattern data in accordance with the sheet color. Thus, pattern information can be more efficiently written.

In yet another embodiment, pattern data is superposed on an image before reordering thereof, by arranging a pattern image superposing device in a stage preceding the data reordering device. Thus, data superposition can be relatively simple.

This disclosure also provides a method for processing color image data for a color printing apparatus. In an exemplary embodiment, the method comprises storing input image data, extracting an image data region from the stored image data, superposing specified pattern data on the image data in accordance with a result of the image data region extraction, reordering the image data in accordance with a printing manner, and transmitting the image and pattern data to an image formation system.

DESCRIPTION OF DRAWINGS

A more complete appreciation of the present invention and many of the attendant advantages thereof will be better understood by reference to the following detailed description when considered in connection with the accompanying drawings, wherein:

FIG. 2 is a diagram illustrating exemplary image data output by the color printing apparatus according to the first embodiment;

FIG. 3 is a diagram illustrating another exemplary image data output by the color printing apparatus according to the first embodiment;

PREFERRED EMBODIMENTS OF THE PRESENT DISCLOSURE

Figure 1:
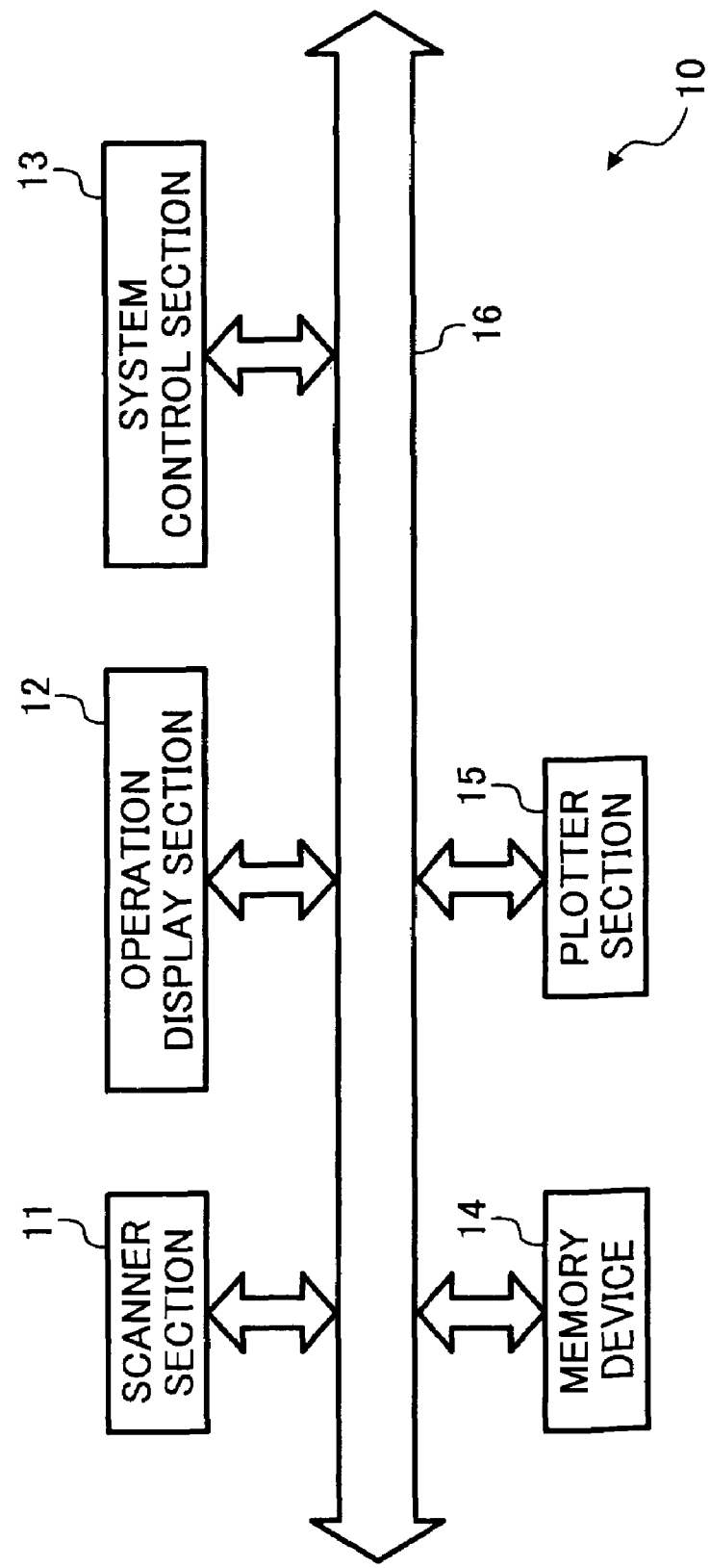
FIG. 1 is a block chart illustrating a schematic configuration of a color printing apparatus according to a first embodiment of the present application.

Some examples and exemplary embodiments will be described below with reference to the drawings, wherein like reference numerals and marks designate identical or corresponding parts throughout several figures. In summary, a color printing apparatus can include an image memory configured to store input image data, an image region extracting device configured to extract an image region in the image memory, an image superposing device configured to superpose specified pattern data on the image data stored in the image memory in accordance with a result of extraction performed by the image region extracting device, data reordering device configured to reorder the image data in accordance with a printing manner, and a data launching device configured to launch data to be printed to an image formation system.

An exemplary color printing apparatus according to a first embodiment of the present application will now be described with reference to FIG. 1. An instrument referenced hereinafter includes an image inputting device. The image inputting device is not necessarily a scanner and can be a type capable of inputting image data from a host apparatus or other types of devices. A color printing apparatus 10 includes a scanner 11, an operation display 12, a system controller 13, a memory 14, and a plotter 15. These devices are connected to each other via an internal bus 16. The scanner 11 serves as an image inputting device for reading and converting an image into digital data, and is formed from an optical mechanism such as a reduction optical system having a light source, a lens, a CCD, and A/D converter, and an image processing device or the like. Image data taken by the scanner 11 is temporary stored in the memory 14, and is transferred to the plotter 15 at a requisite speed. The image data is then printed out as a color image. The operation display 12 serves as a man-machine interface and allows an operator to input various commands and display various messages to the operator. The system controller 13 generally controls the entire instrument and includes a CPU, a ROM, a RAM, a DMAC, and similar devices.

Now, various examples of image data output by the color printing apparatus 10 are described with reference to FIGS. 2 to 4, wherein an ink jet recording apparatus is described as an example of the color printing apparatus 10.

An image obtained by one stroke of an ink jet head is shown in FIG. 2, in which a circle corresponds to a pixel. Specifically, an output of an image is shown there when the inkjet head moves from left to right, for example. For the purpose of easy comprehension, an ink jet process using a single component color will be described, although generally a color ink jet process employs various component colors. Since the inkjet head has eight dots in the sub-scanning direction, and outputs those during every movement from left to right side ends, a two-dimensional image is formed. In this example, since the inkjet head is vertically arranged and conventional raster scanning is performed in an order of image data in the memory, a mechanism is generally required to abstract the image data vertically from a plurality of lines. The mechanism is realized by a later mentioned data reordering device. However, since the next dot is applied before an adjacent dot has not yet dried, phenomenon such as blur generally takes place, and thereby a quality of an output image deteriorates.

In order to suppress such undesirable phenomenon, outputs are made every other dot in a main scanning direction during the first stroke as shown in the upper section of FIG. 3. Then, the second stroke fills in so as to complete a dot image as shown in the lower section thereof.

Figure 4:
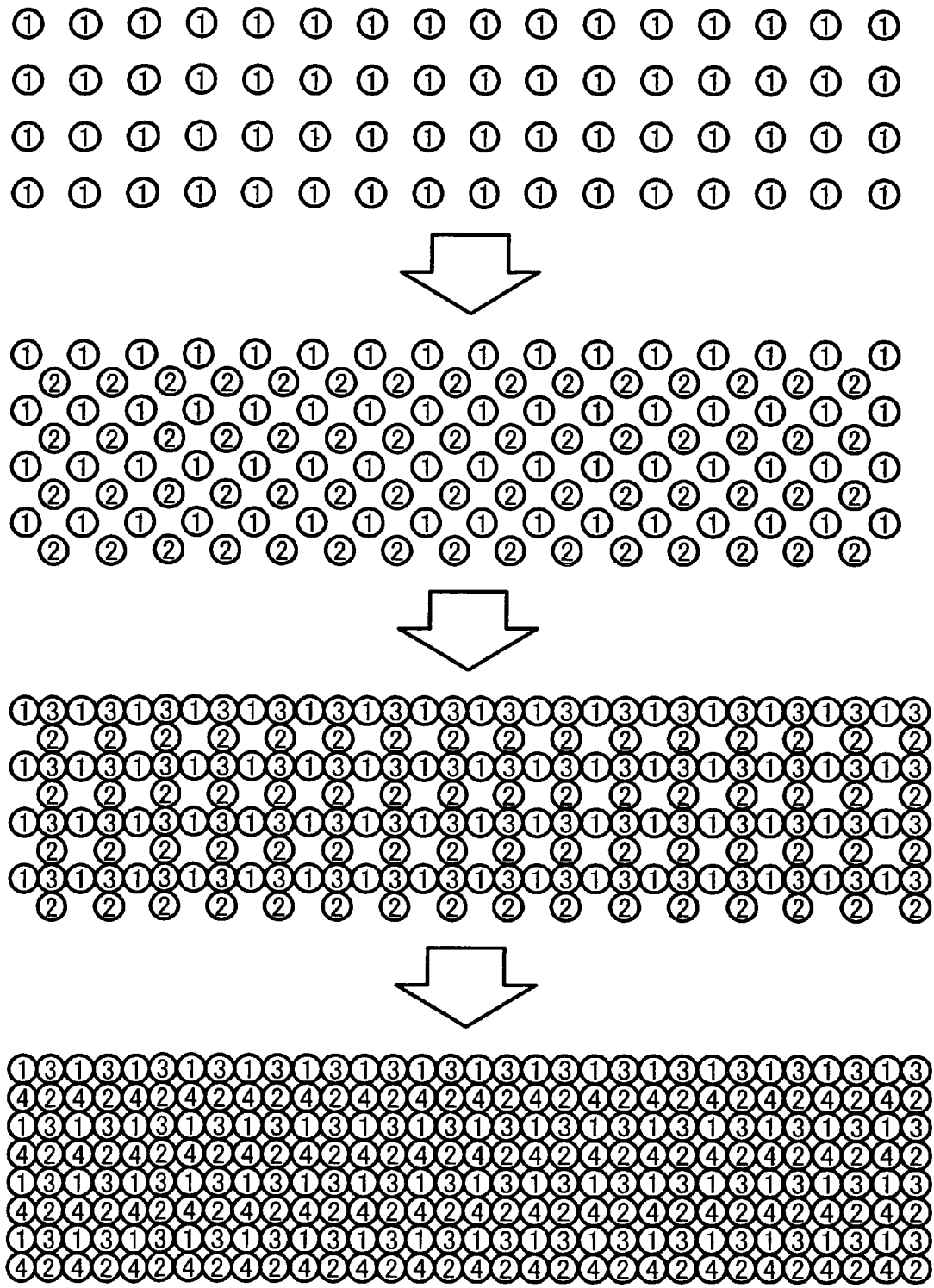
FIG. 4 is a diagram illustrating still another exemplary image data output by the color printing apparatus according to the first embodiment.

Further, as shown in FIG. 4, if a dot image is completed by four strokes, a quality of the dot image is further improved. As for movement of the inkjet head, since a mechanical positional precision is greatly improved and an output image can be higher quality, the inkjet head is continuously moving and writes in one direction from the left, for example. If writing is also performed in the opposite direction, image quality slightly deteriorates due to decrease in positional precision.

When attempting to improve a quality of an image in this manner, a number of strokes increases and printing unavoidably takes long, because a moving distance of the carriage is extended by returning to a home position serving as a default start position for the carriage and the like.

Figure 5:
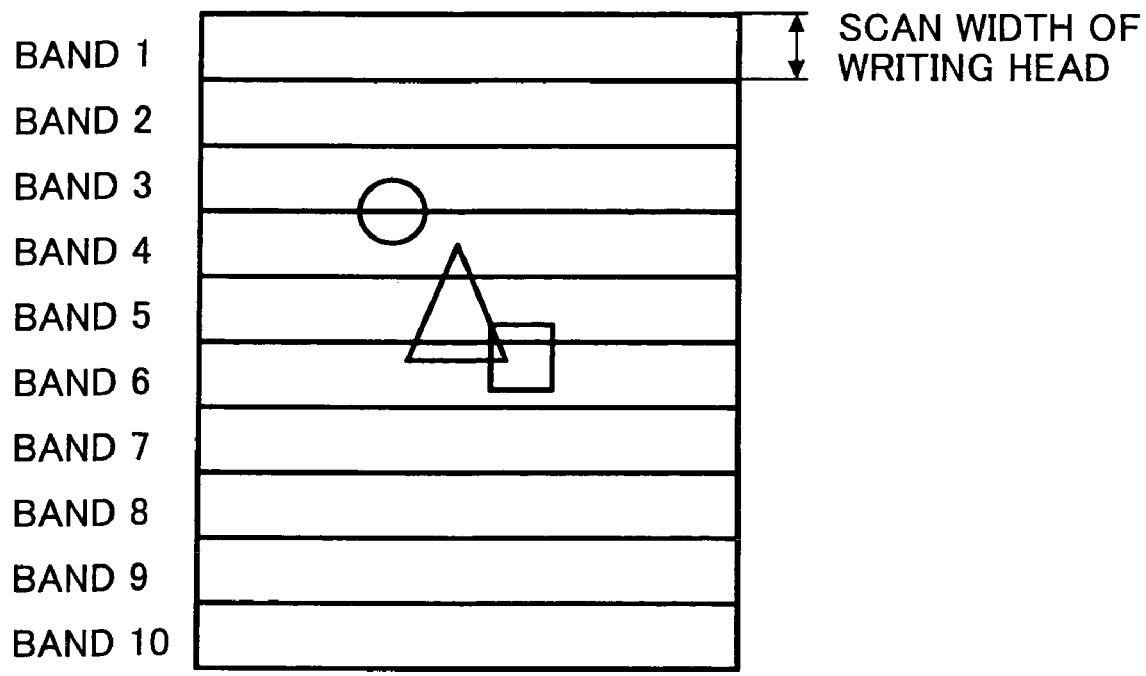
FIG. 5 is a chart illustrating an exemplary image formed during a stroke of a printing head having a width in a sub scanning direction.

As shown in FIG. 5, if an image which is ten times the width of the inkjet head in the sub scanning direction (hereinafter referred to as a scan width) is to be formed by at least ten strokes, for example, since a blank exists on bands 1, 2, and 7 to 10, it is needless to move and write with the inkjet head through the blank bands which unnecessarily consumes time. In such a situation, an output time per a recording medium (such as a sheet) is controlled and shortened by feeding it faster than usual or omitting writing itself.

The example shown in FIG. 5 illustrates a case of the sub-scanning direction. However, a similar operation can be performed to reduce time in accordance with an image data existence condition in the main scanning direction by speeding up movement of the carriage in an image data blank region, or returning the carriage to the home position immediately after an image data region has been passed and only a blank remains in the right side, and so on.

Figure 6:
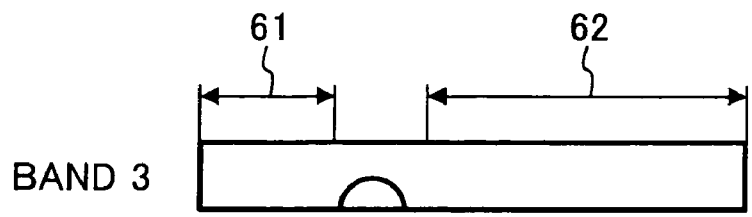
FIG. 6 is a chart partially illustrating the image of FIG. 5.

For example, when referring to FIG. 6 which is a view of band three in FIG. 5, since there exists a blank in an area 61, the carriage can be moved at high speed therethrough, and an image is output corresponding to an image existing region. Since a blank exists in an area 62, the carriage can be returned at high speed, or is conveyed to the right side end. In this way, various methods can be adopted.

Specifically, a manner of moving the carriage is determined in accordance with an image data existence condition in area bands written by one stroke. Thus, blank regions can be detected in advance using hardware during data transfer between memories. For example, a detecting circuit can be formed from a counter capable of stopping when there is data at the left side end, for example. Alternatively, a continuous blank region can be detected by software. Of course, such an operation can be performed by reading a memory with a sufficiently fast calculating device. Further, the hardware detecting device can be employed in order to simply speed up processing.

Further, since an order of sending image data to the ink jet head varies in accordance with a printing manner, such as a number of strokes required to write an image, a writing start origin, and soon as mentioned above, reordering of image data is performed as needed in the ink jet process.

Figure 7:
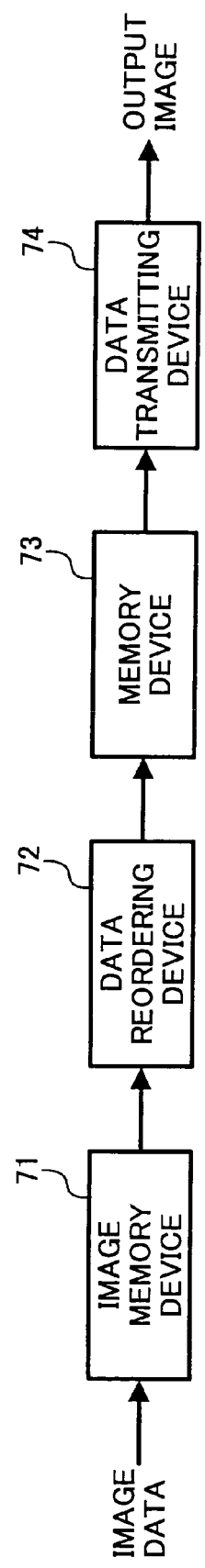
FIG. 7 is a block chart illustrating a process starting from when image data is reordered to when it is launched to an ink jet head.

A process starting from reordering to transmitting image data to the ink jet head will be explained with reference to FIG. 7. As shown, input image data is temporarily stored in image memory 71. The data reordering device 72 reads the image data in a prescribed order from the image memory 71, and reorders the image data. The data reordering device 72 writes reordered image data in the image memory 73. In this regard, it is expedient that image data written in the memory 73 has a length of one stroke. An image data region or an image data blank region is determined, and the data launching device 74 reads image data of an image existing range from the memory 73 in turn, and launches them to the ink jet head as an output image. At that time, a high-speed printing is achieved by moving the inkjet head at high speed or similar manners.

Figure 8:
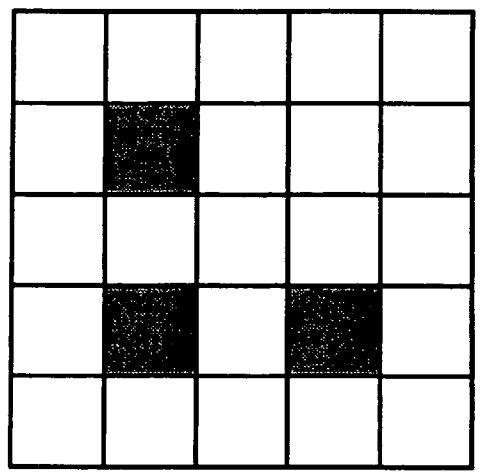
FIG. 8 is a diagram illustrating a pattern to be superposed and output with an image.
Figure 9:
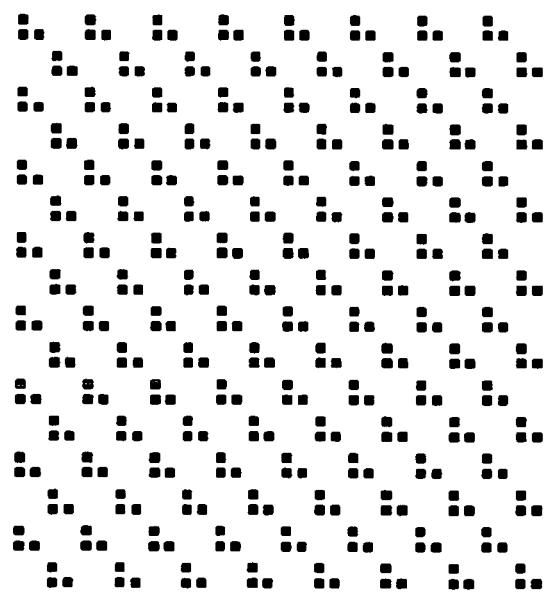
FIG. 9 is a chart illustrating an exemplary method of repeatedly superposing the pattern of FIG. 8 on image data.

The above-described method demonstrates that output efficiency does not decrease even when a specified pattern is superposed on image data and is output in the color printing apparatus employing the ink jet process according to the first embodiment. The pattern to be superposed on the image and output is exemplified in FIG. 8. As shown, a pattern identifying an instrument is formed by filling in a unit of five times five pixels with one or more specified bits. Specifically, an example of repeatedly superposing this data on image data is illustrated in FIG. 9, and as shown, the pattern of FIG. 8 is repeated. With such a pattern being written within an image area, an output instrument can be identified when the pattern is detected from the output image.

Figure 10:
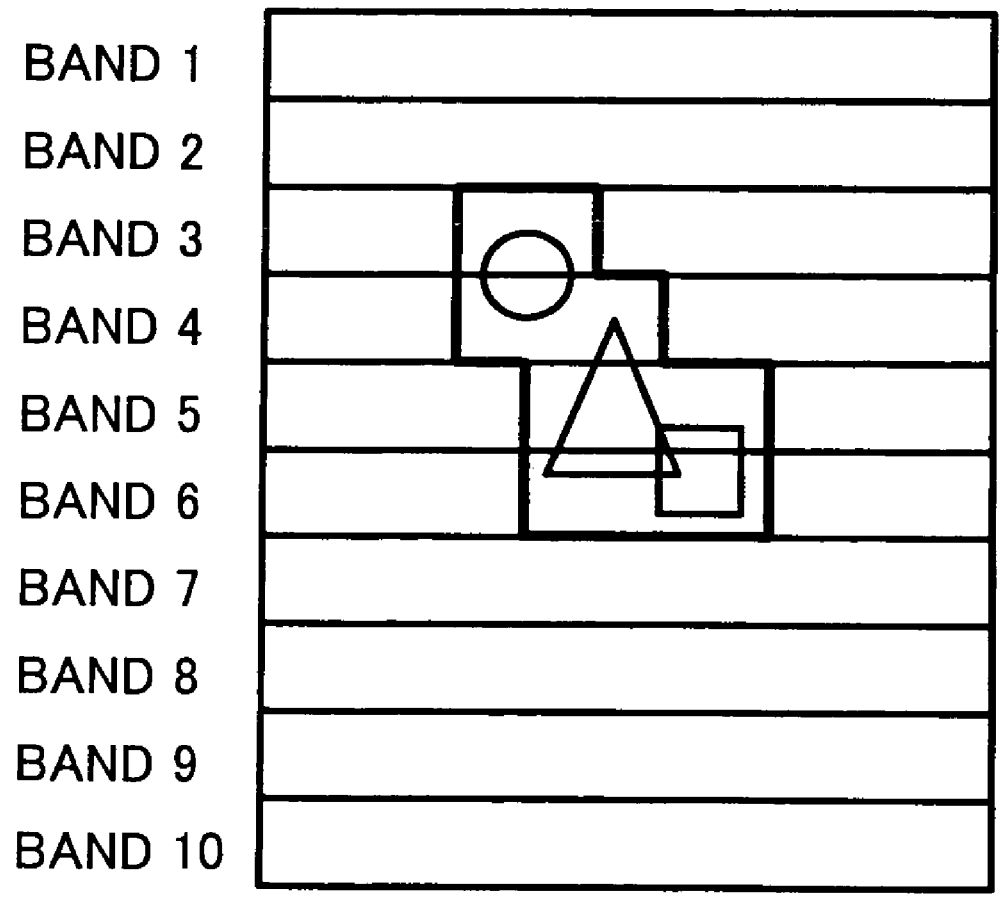
FIG. 10 is a diagram showing an exemplary image existing region surrounded by a black boarder.
Figure 11:
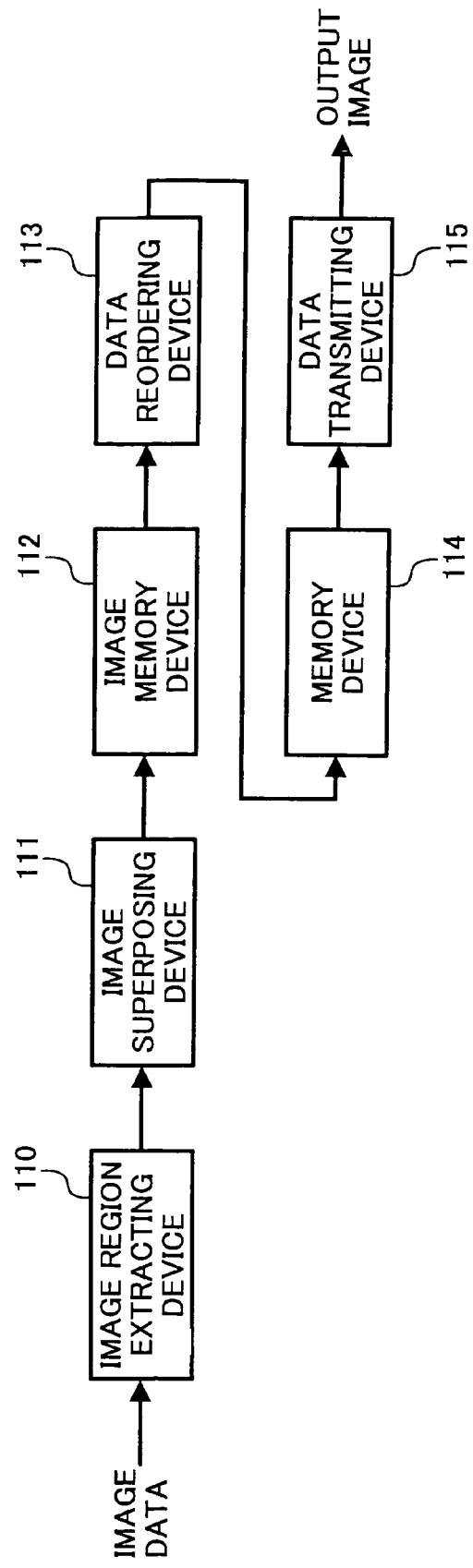
FIG. 11 is a block chart illustrating a process starting from when image data is superposed to when it is reordered and launched to an ink jet head.

When writing such a pattern, it is most efficient to repeatedly fill in the entire image with the same patterns from a hardware point of view. However, the inkjet process decreases an output speed as a result. That is, the pattern data is superposed on an image data blank region, and thus, the region is written without skipping. On the other hand, it would be more efficient to detect an image data blank region before the above-mentioned pattern data is superposed on image data, and superpose the pattern data only on an image existing region. As shown in FIG. 10, the pattern data is controlled to be superposed only on a region including image data surrounded by a black boarder. By superposing the pattern in such a manner, a necessary pattern can be output without reducing depiction efficiency required for a high speed ink jet process. Such pattern superposition can be performed in any steps of a data flow. However, in order for necessary data pattern to be finally output after reordering, superposition can be performed in accordance with the reordering. In contrast, superposition on ordinary order data, i.e., raster scan data, can be executed before the reordering. An exemplary configuration of the latter system is shown in FIG. 11. Specifically, an image superposing device 111 superposes pattern data on input image data during their transfer between memories, and data containing the superposition of the pattern data is temporary stored in an image memory 112. Additional processes are omitted from the explanation because they are substantially identical to the processes described with reference to FIG. 7.

Figure 12:
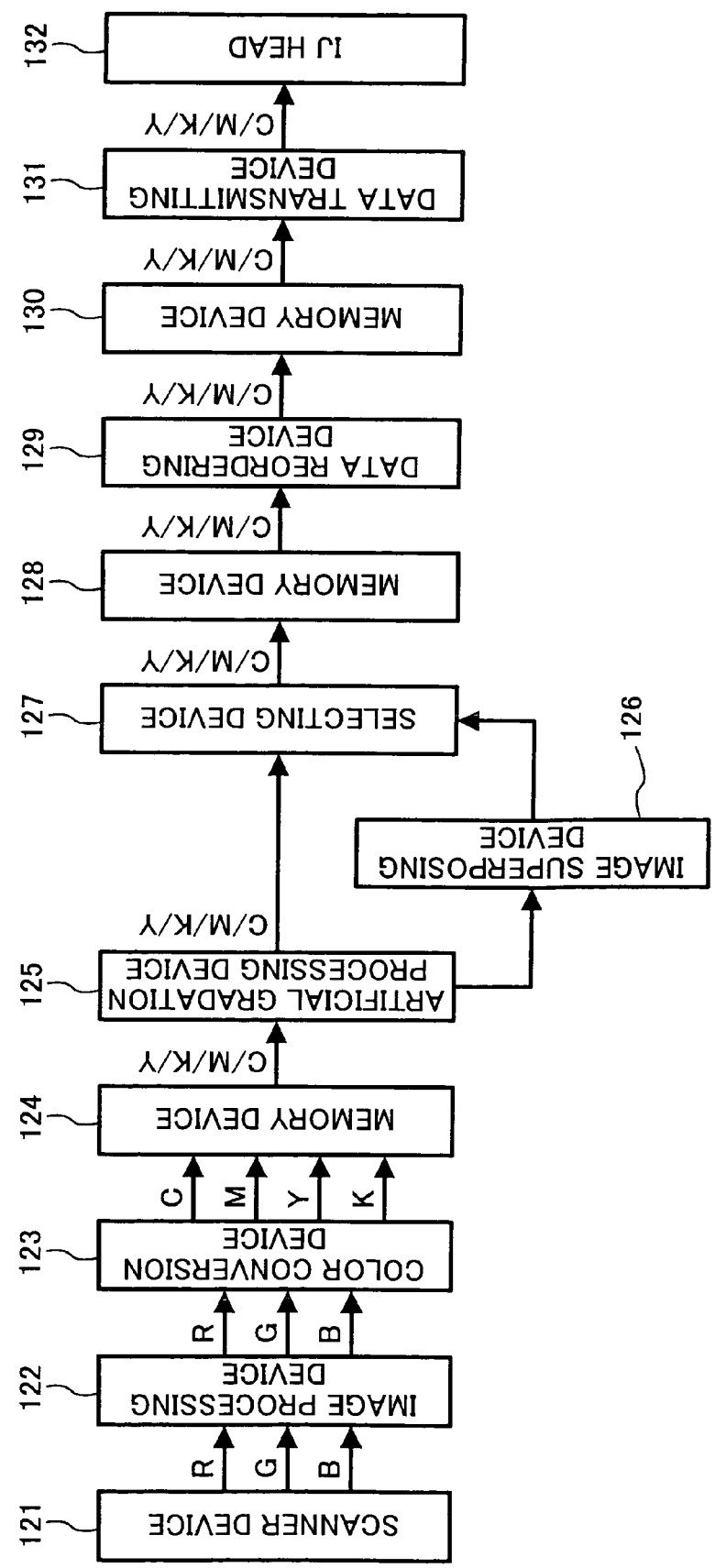
FIG. 12 is a block chart illustrating a process starting from when an image is input to when it is launched to an ink jet head in a color printing apparatus according to a second embodiment of the present application.

A color printing apparatus according to another embodiment is now described with reference to FIG. 12. In the color printing apparatus of FIG. 12, pattern data having a prescribed component color selected from amongst various component colors is utilized. A data flow starting from image input to the color printing apparatus according to the second embodiment is shown in FIG. 12. As shown, image data read by a scanner device 121 is a signal of an RGB color space, and undergoes a process such as Y adjustment, MTF correction, etc, in an image processing device 122. The image data is then input to a color conversion device 123. At this moment, the image data is finally converted into a color space of ink. Conversion into four colors CMYK is exemplified in this example. However, the conversion is not limited to the above four color ink, and can be adapted according to an instrument type. For example, in order to smoothly reproduce a halftone color, i.e., to suppress a granulated image, more multiple color ink can be utilized. Of course, the conversion method is not unique and varies in view of various performances of ink. However, the ink simply includes the four colors CMYK in this example. Thus converted image data is temporarily stored in the memory 124. The image data then decreases a number of gradation levels into a prescribed level, for example, binary or multi-value data, through an operation of a pseudo gradation processing device 125 so that the ink jet head can print. Such conversion is generally executed using a dither system or an error diffusion system. A process thereafter is not simultaneously performed, but is performed per each color. However, such processing can be simultaneous. In such a situation, a pseudo-gradation processing device preferably can simultaneously processing the four colors separately. A data flow after processing of the colors is similar to that described with reference to FIG. 7 or FIG. 11. Since the ink jet head 132 includes a discharge nozzle per a color, image data is launched per the color, and ink is discharged at a prescribed timing in accordance with the image data.

Superposition of pattern data is performed by an image superposing device 126 in the subsequent stage of the pseudo-gradation processing device 125. In the color printing apparatus according to the second embodiment, a selection device 127 selects one of image data having undergone superposition of the pattern data and that having not yet undergone the superposition. At this moment, only a color is controlled to pass through the image superposition device 126.

Figure 14:
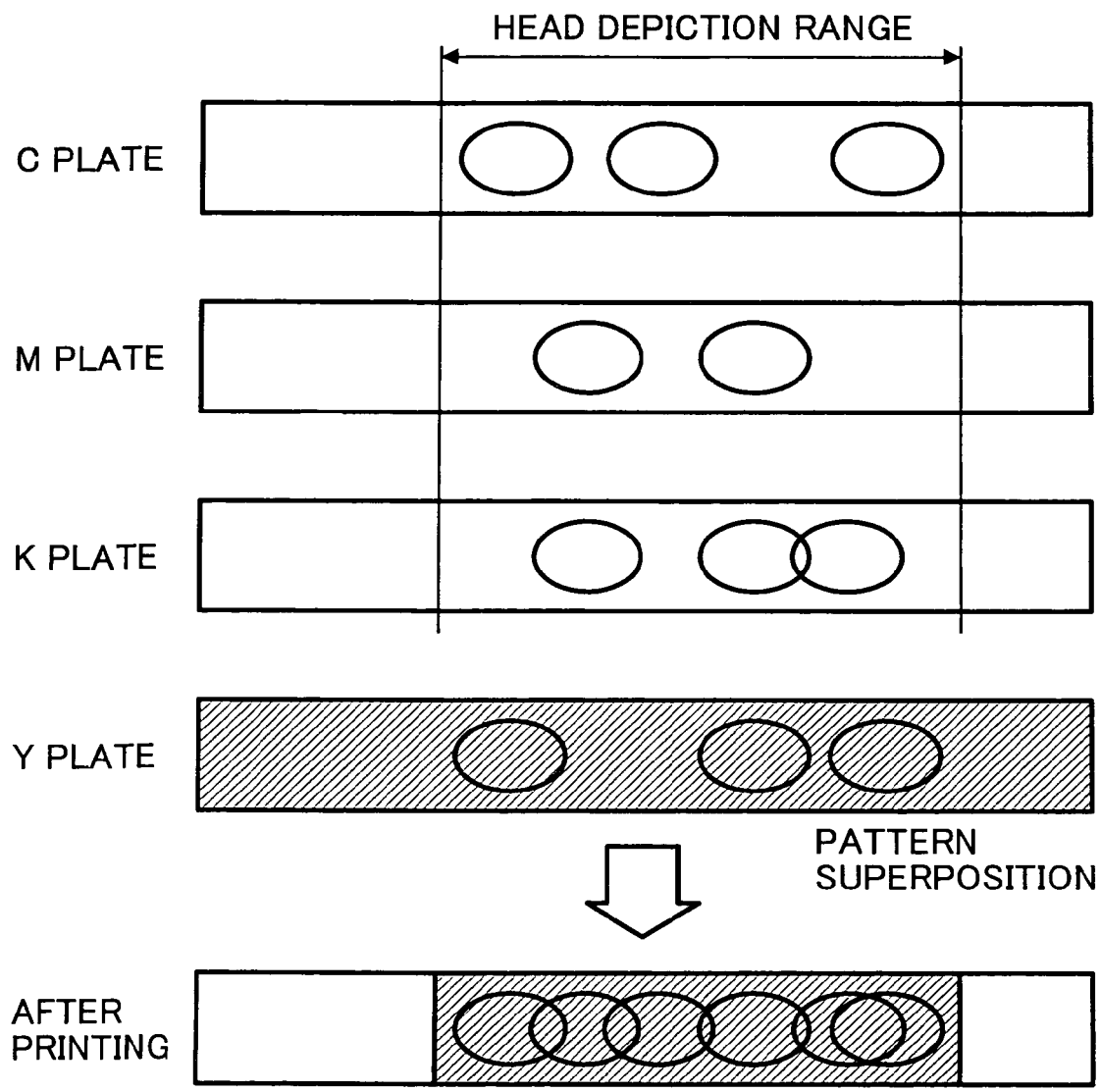
FIG. 14 is a chart illustrating a pattern superposition range determining process performed by detecting image existing regions of the component color planes other than the component color plane on which the single component color of the pattern resides.

A color printing apparatus according to a third embodiment is now described with reference to FIG. 14. As shown, an area to receive superposition is determined based upon image data on component color planes C, M, and K other than the component color plane Y having entirely received pattern writing. In such a situation, the pattern is preferably written over the Y component color plane starting from its leftmost end regardless of an image data region. Thus, when the image data are output, movement of the inkjet head is controlled in accordance with the image data region in the CMK component color planes included in the memory 130, and image data on the Y component color plane corresponding to the image data of the CMK component color planes is output. By controlling in such a manner, a pattern superposing time can be simply controlled.

Further, when only Y color image data exists outside the inkjet head depiction range determined by the other component colors C, M, and K, it cannot be outputted. Thus, the color conversion device 123 always converts RGB signals into component colors CMYK and does not convert into Y component color alone.

A color printing apparatus according to a fourth embodiment is now described. In the color printing apparatus of the fourth embodiment, a component color of a pattern to be superposed employs a reduced shade color such as Yellow, for example, to be hardly perceptible to human. Of course, it is not limited to the Yellow, and superposition pattern data can be a component color other than the Yellow, when multiple inks other than four colors are utilized. Important matter is that written information does not visually disturb an original image. In addition, the smaller the dot size, the less noticeable when the pattern data is output.

A color printing apparatus according to a fifth embodiment is now described. The fifth embodiment enables selection of a component color to write a pattern in accordance with a recording medium color. It is preferable that a reduced shade color such as Yellow is used when a white sheet receives pattern printing. However, it can be supposed that a written pattern itself is hardly detected when printed on a sheet of somewhat darker color such as a recycle sheet. In such a situation, a thicker color is used to print a pattern.

Figure 13:
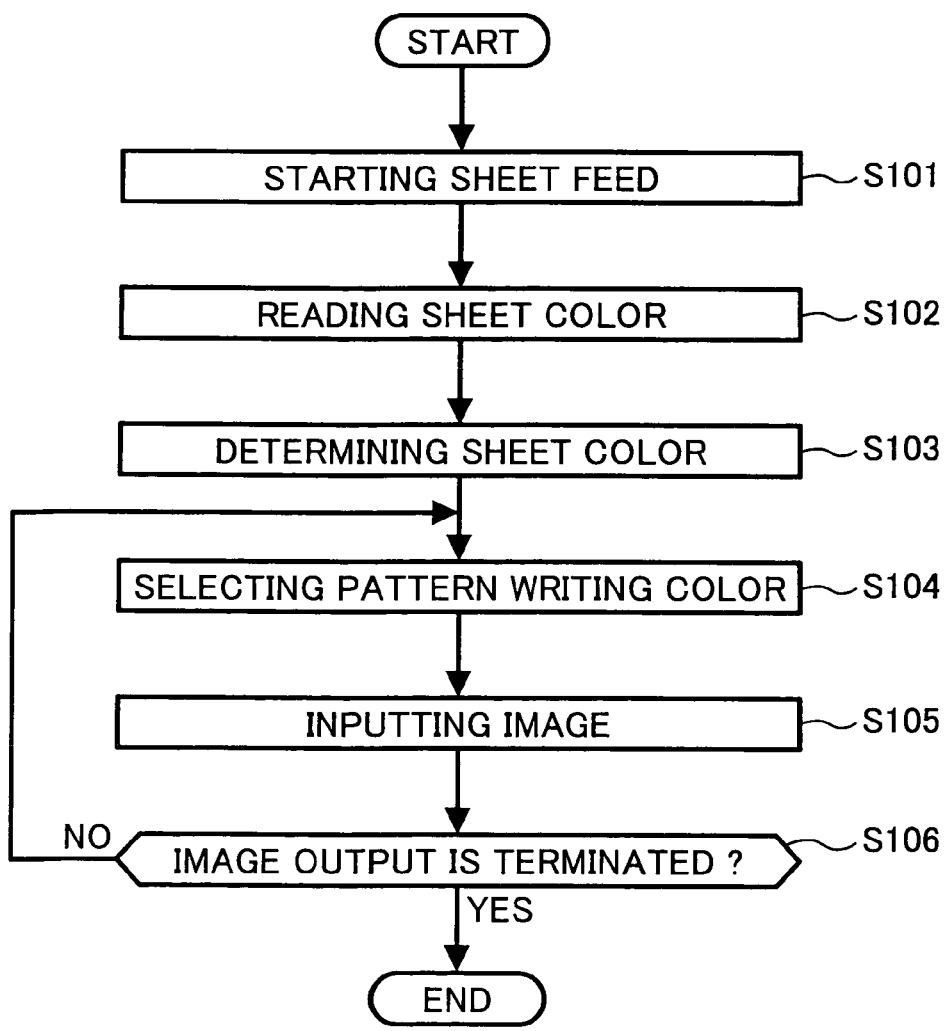
FIG. 13 is a flowchart illustrating an operation of a color printing apparatus according to another embodiment of the present application.

A color printing apparatus according to a sixth embodiment is now described. The sixth embodiment modifies the color printing apparatus of the fifth embodiment by enabling automatic selection of a component color to superpose pattern data based upon a color detected by a sheet color sensor. An operational flow of the color printing apparatus is now described with reference to a flowchart of FIG. 13. As shown, when a sheet feeding is started (Yes, in step S101), a sheet color is read (in step S102) by the sheet color sensor (not shown) disposed on a sheet conveyance path. A component color to write pattern is then selected in accordance with the sheet color information (in steps S103 and S104). Remaining operations are substantially the same as above.

A color printing apparatus according to a seventh embodiment is now described. In the color printing apparatus of the seventh embodiment, if an image superposing device is positioned at a subsequent stage of a data reordering device, image data can be reordered in accordance with an order of reordered image data and pattern data is then superposed thereon to be properly displayed when printed. Since a print condition such as a number of strokes required for completing a dot image, a scanning start origin, etc., can frequently change, a circuit becomes complex. The circuit superposing pattern data on image data can be simpler if appropriately disposed before the image data is reordered.

Numerous additional modifications and variations of the present invention are possible in light of the above teachings. It is therefore to be understood that within the scope of the appended claims, the present invention may be practiced otherwise than as specifically described herein. For example, elements and/or features of different illustrative embodiments maybe combined with each other and/or substituted for each other within the scope of this disclosure and appended claims.

This application claims priority under 35 USC §119 to Japanese Patent Application No. 2003-199094 filed on Jul. 18, 2003, the entire contents of which are herein incorporated by reference.

What is claimed is:

1. A color printing apparatus configured to output color image data, comprising:

an image memory configured to store input image data;

an image region extracting device configured to extract an image data region from the image data in the image memory;

a pattern superposing device configured to superpose specified pattern data on the image data stored in the image memory in accordance with a result of extraction performed by the image region extracting device;

a data reordering device configured to reorder the image data in accordance with a printing manner; and a data transmitting device configured to transmit the image and pattern data to an image formation system, wherein said image region extracting device extracts the image data region from color separation planes other than a component color plane occupied by the specified pattern data to be superposed on the image data.

2. The color printing apparatus according to claim 1, wherein said specified pattern data includes only single component color selected from amongst colors of printing use color separation planes.

3. The color printing apparatus according to claim 1, wherein a component color of the specified pattern data is not substantially perceptible to the human eye.

4. The color printing apparatus according to claim 3, wherein said component color is selected in accordance with a printing medium color.

5. The color printing apparatus according to claim 1, further comprising:
a color sensor configured to detect a color of printing medium; and
a color selecting device configured to automatically select a color for the specified pattern data in accordance with the printing medium color detected by the color sensor.

6. The color printing apparatus according to claim 1, wherein said image superposing device is arranged in a stage preceding the data reordering device.

7. A color printing apparatus comprising:
storage means for storing input image data;
image region extracting means for extracting an image data region from the image data stored in the storage means;
pattern superposing means for superposing specified pattern data on the image data in accordance with a result of the extraction operation performed by the image region extracting means;
reordering means for reordering the image data in accordance with a printing manner; and
transmitting means for transmitting the image and pattern data to an image formation system,
wherein said image region extracting means extracts the image data region from color separation planes not occupied by the specified pattern data which is to be superposed on the image data.

8. The color printing apparatus according to claim 7, further comprising:
color sensor means for detecting a color of a printing medium; and
color selection means configured to automatically select a color for the specified pattern data in accordance with the printing medium color detected by the color sensor means.

9. The color printing apparatus according to claim 7, wherein only a single component color selected amongst colors of printing use color separation planes is used for said specified pattern data.

10. The color printing apparatus according to claim 9, wherein the component color of the specified pattern data is not substantially perceptible to the human eye.

11. The color printing apparatus according to claim 9, wherein said component color is selected in accordance with a printing medium color.

12. The color printing apparatus according to claim 7, wherein said pattern superposing means is arranged in a stage preceding the reordering means.

13. A method for processing color image data for a color printing apparatus, the method comprising the steps of:
storing input image data;
extracting an image data region from the stored image data;
superposing specified pattern data on the image data in accordance with a result of the image data region extraction;
reordering the image data in accordance with a printing manner; and
transmitting the image and pattern data to an image formation system,
wherein the image data region is extracted from color separation planes not occupied by the specified pattern data which is to be superposed on the image data.

14. The method of claim 13, further comprising the steps of:
providing a color sensor to detect a color of a printing medium; and
selecting a color for the specified pattern data in accordance with the printing medium color detected by the color sensor.

15. The method of claim 13, further comprising selecting only a single component color for said specified pattern data, from amongst colors of printing use color separation planes.

16. The method of claim 15, wherein the component color of the specified pattern data is not substantially perceptible to the human eye.

17. The method of claim 13, further comprising selecting a color for the specified pattern data in accordance with a printing medium color.

* * * * *